US007015807B2

(12) United States Patent
Roby et al.

(10) Patent No.: US 7,015,807 B2
(45) Date of Patent: Mar. 21, 2006

(54) METHOD AND APPARATUS FOR INDICATING ACTIVATION OF A SMOKE DETECTOR ALARM

(75) Inventors: Richard J. Roby, Columbia, MD (US); Michael S. Klassen, Columbia, MD (US); Christopher F. Schemel, Laurel, MD (US); Diwakar Vashishat, Germantown, MD (US); Maclain M. Holton, Columbia, MD (US); Kelly R. Flint, Greenbelt, MD (US)

(73) Assignee: Combustion Science & Engineering, Inc., Columbia, MD (US)

( * ) Notice: Subject to any disclaimer, the term of this patent is extended or adjusted under 35 U.S.C. 154(b) by 88 days.

(21) Appl. No.: 10/676,779

(22) Filed: Oct. 2, 2003

(65) Prior Publication Data

US 2004/0145467 A1 Jul. 29, 2004

Related U.S. Application Data

(60) Provisional application No. 60/415,127, filed on Oct. 2, 2002.

(51) Int. Cl.
G08B 1/00 (2006.01)
(52) U.S. Cl. .................. 340/531; 340/628; 340/511; 381/56
(58) Field of Classification Search ............ 340/531, 340/539.1, 539.11, 539.27, 628, 902, 407.1
See application file for complete search history.

(56) References Cited

U.S. PATENT DOCUMENTS

| 4,220,857 A | 9/1980 | Bright |
| 4,227,191 A | 10/1980 | Raber |
| 4,250,500 A | 2/1981 | Schade |
| 4,260,981 A | 4/1981 | Yamauchi et al. |
| 4,287,509 A | 9/1981 | Beggs |
| 4,365,238 A | 12/1982 | Kollin |
| 4,380,759 A | 4/1983 | Sulkoski et al. |
| 4,417,235 A * | 11/1983 | Del Grande ............... 340/531 |
| 4,438,428 A | 3/1984 | Ober et al. |
| 4,777,474 A | 10/1988 | Clayton |
| 4,853,674 A | 8/1989 | Kiss |
| 4,956,866 A * | 9/1990 | Bernstein et al. .......... 704/274 |
| 5,012,223 A | 4/1991 | Griebell et al. |
| 5,287,411 A * | 2/1994 | Hill et al. .................. 704/231 |
| 5,651,070 A | 7/1997 | Blunt |

(Continued)

FOREIGN PATENT DOCUMENTS

WO WO00/74013 12/2000

*Primary Examiner*—Benjamin C. Lee
(74) *Attorney, Agent, or Firm*—DLA Piper Rudnick Gray Cary US LLP

(57) ABSTRACT

A method for detecting smoke detector alarms comprises analyzing at least two parameters of ambient sound over a period of time to detect a temporal pattern of the alarm. In one embodiment, a series of samples are taken over a period of time sufficiently long to include at least one full period of a repeating sound pattern, and the two parameters are frequency and amplitude of the loudest sound in each sample. The algorithmic analysis may be triggered by a detection algorithm that utilizes a lower amount of power than the algorithmic analysis. In other embodiments, the detection apparatus is incorporated into a conventional smoke detector that will detect both smoke and an alarm from another detector. In another embodiment, a smoke detector includes a transceiver to transmit an activation signal to neighboring smoke detectors when a fire is detected and to receive an activation signal from neighboring detectors.

14 Claims, 10 Drawing Sheets

U.S. PATENT DOCUMENTS

| | | |
|---|---|---|
| 5,666,331 A | 9/1997 | Kollin |
| 5,686,884 A | 11/1997 | Larkin et al. |
| 5,691,703 A | 11/1997 | Roby et al. |
| 5,790,050 A | 8/1998 | Parker |
| 5,867,105 A | 2/1999 | Hajel |
| 5,889,468 A * | 3/1999 | Banga ........................ 340/628 |
| 5,898,369 A * | 4/1999 | Godwin ................. 340/539.26 |
| 5,917,420 A | 6/1999 | Gonzalez |
| 5,990,797 A | 11/1999 | Zlotchenko et al. |
| 5,999,089 A * | 12/1999 | Carlson ...................... 340/328 |
| 6,087,960 A * | 7/2000 | Kyouno et al. ............. 340/902 |
| 6,094,134 A | 7/2000 | Cohen |
| 6,384,724 B1 * | 5/2002 | Landais ...................... 340/531 |
| 6,420,973 B1 * | 7/2002 | Acevedo ..................... 340/628 |

* cited by examiner

METHOD AND APPARATUS FOR INDICATING ACTIVATION OF A SMOKE DETECTOR ALARM

TITLE OF THE INVENTION

This application claims priority from U.S. Provisional Application Ser. No. 60/415,127 filed Oct. 2, 2002. The entirety of that provisional application is incorporated herein by reference.

BACKGROUND OF THE INVENTION

1. Field of the Invention

The present invention relates to methods and devices for detecting the activation of an audible smoke detector alarm.

2. Background of the Technology

During a fire, the occupants of a building may only have a few minutes to escape without harm. Due to the potentially small escape time, it is imperative to give ample warning to the occupants of a burning building. Most devices sold by the fire safety industry rely on audible alarms to alert the occupants in a residential building. Unfortunately, these devices do not help the hearing impaired. Thus, a need arises for a device that provides ample protection for the hearing-impaired in case of a fire emergency.

Known in the art are devices that use visual signals to alert the hearing-impaired of a fire emergency. Examples of such devices are described in U.S. Pat. Nos. 4,227,191 and 4,287,509. These devices combine a detector and a visual alarm in a single device. Another visual warning device is disclosed in U.S. Pat. No. 5,012,223. This device detects the sound from a remote smoke detector and activates a light in response thereto. Visual alarm devices such as these suffer from the serious drawback of being ineffective in alerting a hearing-impaired individual who is asleep.

To address this need, systems combining tactile stimulation (e.g., vibrators and bed shakers) have been proposed. One such device is described in U.S. Pat. No. 4,380,759. This device includes a vibration sensor that is placed next to a smoke detector. When the smoke detector activates, the vibration from the audible alarm triggers a vibrating reed that causes a mild sensation on the skin. Devices such as this are cumbersome to use (especially when the device will only be used at a location temporarily, as in a hotel room) as the user must place the transmitting unit in physical contact with the smoke detector, which is often on a ceiling or otherwise difficult to reach. Other devices for the hearing impaired (e.g., the device disclosed in U.S. Pat. No. 5,917,420) involve the transmission of signals from a detector to a furniture shaker or other tactile stimulation device. While devices such as these are a step in the right direction, they are usually quite expensive and, more importantly, require special hardware.

U.S. Pat. No. 5,651,070 describes a warning device that "listens" for sounds made by devices such as doorbells and smoke detectors and activates a tactile stimulation device in the form of a wrist-watch. This device records a desired audio alarm and continually compares the recorded alarm to ambient sounds picked up from a microphone. A 4 bit comparator is used to declare a match. What criteria are input to the comparator to declare a match is not disclosed. Additionally, this device is burdensome to use in that it requires the user to record the desired sound prior to use. This can be a problem, for example, when a person enters a hotel room late at night because activation of the smoke detector alarm for the purpose of making the recording may disturb other guests.

In addition to the above considerations, false alarm performance is an important consideration in devices such as these. It is a relatively simple matter to detect the activation of a smoke detector audible alarm; it is an entirely different matter to be able to detect such an alarm without falsely detecting other devices commonly found in the home. Such devices may produce constant broadband noise (e.g., vacuum cleaners and blenders) or may produce intermittent sounds at well defined frequencies at or near the frequency of a smoke detector alarm (e.g., alarm clocks, telephones, cell phones, etc.). It is well known that users quickly learn to ignore an alarm device that is prone to excessive false alarms, thereby rendering such a device useless.

SUMMARY OF THE INVENTION

The foregoing issues are addressed to a great extent by the present invention which provides a method and apparatus for detecting the presence of sounds corresponding to both continuous and intermittent smoke alarms. Alarm determination includes algorithmic analysis of at least two parameters of the sound data and, following detection of a smoke detector alarm signal, triggering of an alarm device. In preferred embodiments, the alarm device is used to provide tactile stimulation.

In a preferred embodiment, a series of temporally spaced samples are taken over a period of time sufficiently long to include at least one full period of a temporally repeating sound pattern of an audible alarm of a smoke detector, and the two parameters that are analyzed for each sample are frequency and amplitude of the loudest sound in that sample. Both of these parameters must match the desired temporal pattern in order for an alarm detection to be declared. In embodiments of the invention directed toward detecting intermittent smoke detector audible alarms, the pattern varies over time. In embodiments directed toward detecting constant smoke detector audible alarms, the pattern does not vary over time.

In another aspect of the invention, which may or may not include a warning device directed toward the hearing impaired, the start of the algorithmic analysis is triggered by a detection algorithm that is designed to utilize a lower amount of power relative to an amount of power consumed by the algorithmic analysis. This is particularly important in devices powered by a battery.

In yet another aspect of the invention, the aforementioned detection apparatus is incorporated into a conventional smoke detector to provide a smoke detector that will detect both smoke and an alarm from another smoke detector. In an alternative embodiment, a smoke detector includes a transceiver to transmit an activation signal to neighboring smoke detectors when smoke indicative of a fire is detected and to receive an activation signal from neighboring detectors. Upon receipt of an activation signal from a neighboring smoke detector, the smoke detector will activate its warning device (audible, tactile, and/or visual). Such embodiments are particularly useful in situations in which station-to-station activation is required (e.g., by a building code) because the embodiments provide a means for achieving station-to-station activation without requiring hard wiring.

BRIEF DESCRIPTION OF THE DRAWINGS

A more complete appreciation of the invention and many of the attendant features and advantages thereof will be readily obtained as the same become better understood by reference to the following detailed description when considered in connection with the accompanying drawings, wherein.

DETAILED DESCRIPTION

The present invention will be discussed with reference to preferred embodiments of devices for detecting audible smoke detector alarms. Specific details are set forth in order to provide a thorough understanding of the present invention. The preferred embodiments discussed herein should not be understood to limit the invention. Furthermore, for ease of understanding, certain method steps are delineated as separate steps; however, these steps should not be construed as necessarily distinct nor order dependent in their performance.

Prior to 1996, the audible alarm on smoke detectors had patterns that varied from manufacturer to manufacturer. Some audible alarms were constant, while others exhibited differing intermittent temporal patterns. However, smoke detectors manufactured after 1996 are required to conform to the National Fire Protection Association standard NFPA 72, which mandates that smoke detectors emit audible alarm signals with the temporal pattern shown in FIG. 1. This pattern consists of three sets of short on/off periods followed by a longer off period. The length of the short on and off periods is specified as 0.5 seconds "on" +/−10% followed by 0.5 seconds "off" +/−10%. The long off period is specified as 1.5 seconds +/−10%. Tests conducted by applicants of several smoke detectors show that most, but not all, detectors meet this specification.

Figure 1:
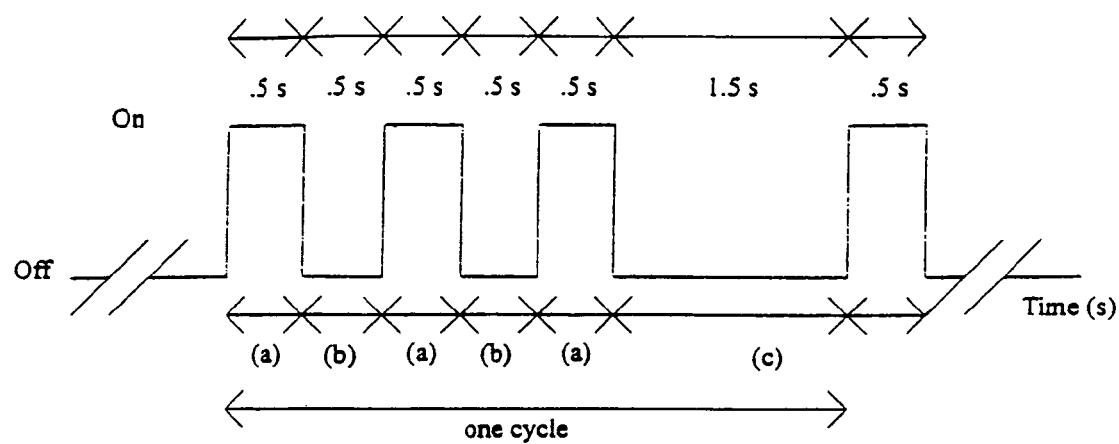
FIG. 1 is a timing diagram illustrating the temporal pattern of a smoke detector audible alarm according to the NFPA standard.

In addition to the temporal pattern of FIG. 1, NFPA 72 also specifies that audible alarm signals intended for operation in the private mode must have a:

sound level of not less than 45 dBA at 10 ft or more than 120 dBA at a minimum hearing distance from the audible appliance;

sound level of at least 15 dBA above the average ambient sound level or 5 dBA above the maximum sound level having a duration of at least 60 seconds, whichever is greater, measured 5 ft above the floor.

For sleeping areas, NFPA 72 also specifies that audible alarm signals must have a:

sound level of at least 15 dBA above the average ambient sound level or 5 dBA above the maximum sound level having a duration of at least 60 seconds or a sound level of at least 70 dBA, which is greater, measured at pillow level in the sleeping area.

Figure 2A:
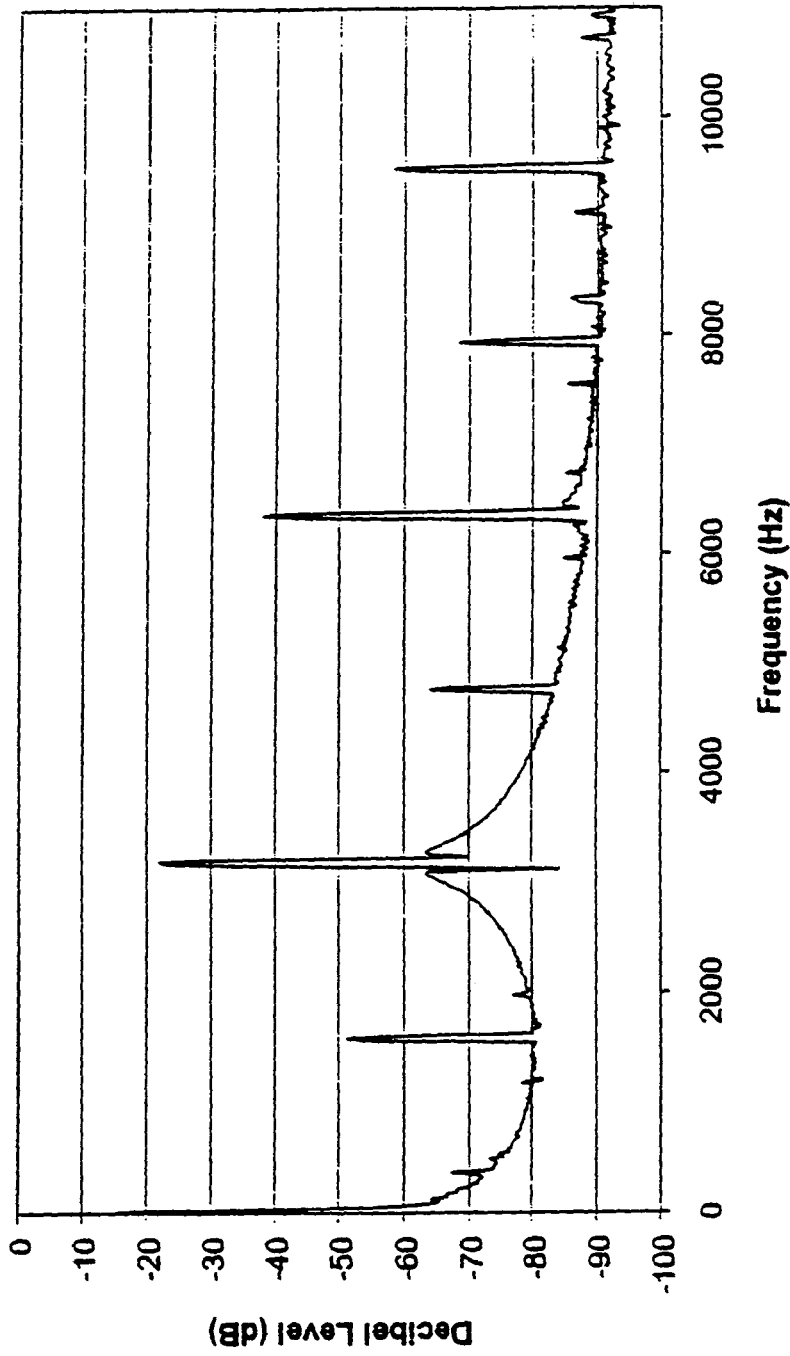
FIGS. 2a and 2b are plots of amplitude as a function of frequency for a typical smoke detector audible alarm taken with the detector in a box lined with foam and in an unlined box, respectively.
Figure 2B:
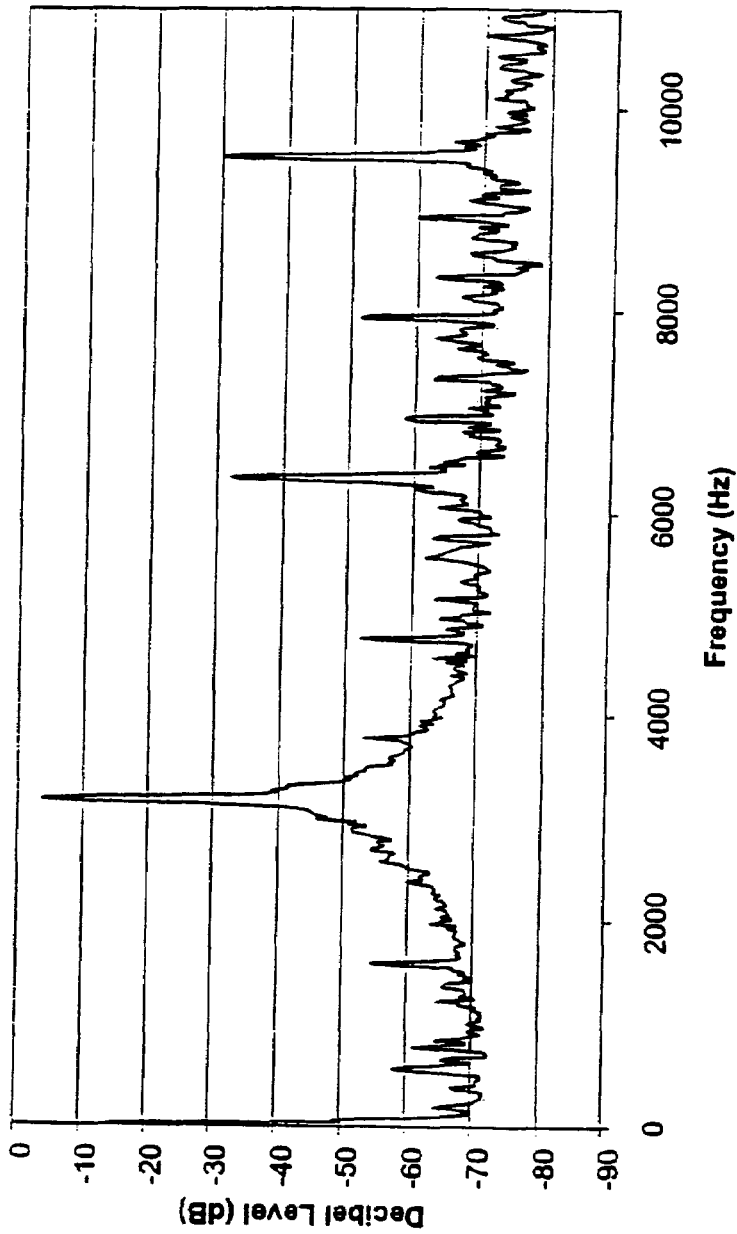

NFPA 72 does not specify a frequency of the audible alarm. However, the applicants have tested approximately 18 presently available smoke detectors and have learned that the audible alarm on most commercially available smoke detectors manufactured after 1996 (as well as some manufactured prior to 1996) have well defined frequency peaks at approximately 3200 Hz +/− approximately 10% as well as peaks at corresponding harmonic frequencies. The 3200 Hz frequency corresponds to a sound that is easily heard by most humans with normal hearing. An exemplary plot of amplitude vs. frequency of an alarm in a typical smoke detector, in this case a model 0914 smoke detector from Fire Sentry, taken in a box lined with foam is shown in FIG. 2a. A plot of amplitude vs. frequency for the same detector in an unlined box is illustrated in FIG. 2b. A summary of the results of 18 smoke detectors tested by applicants is set forth in Table 2:

TABLE 2

Frequency Characteristics of Common Smoke Detector Alarms

|  | Average (Hz) | Max (Hz) | Min (Hz) | Range (Hz) |
| --- | --- | --- | --- | --- |
| Without Foam |  |  |  |  |
| 1st peak | 3245 | 3445 | 3079 | 366 |
| 2nd peak | 6540 | 6885 | 6158 | 727 |
| 3rd peak | 9748 | 10314 | 9259 | 1055 |
| With Foam |  |  |  |  |
| 1st peak | 3265 | 3445 | 3101 | 344 |
| 2nd peak | 6530 | 6869 | 6202 | 668 |
| 3rd peak | 9787 | 10314 | 9302 | 1012 |

Because many smoke detector manufacturers recommend replacing smoke detectors after approximately ten years, the number of pre-1996 smoke detectors still in service is rapidly declining. Accordingly, the invention will be discussed primarily in the context of recognizing the audible alarms of 1996 and newer smoke detectors. However, the invention should not be understood to be so limited.

Figure 3:
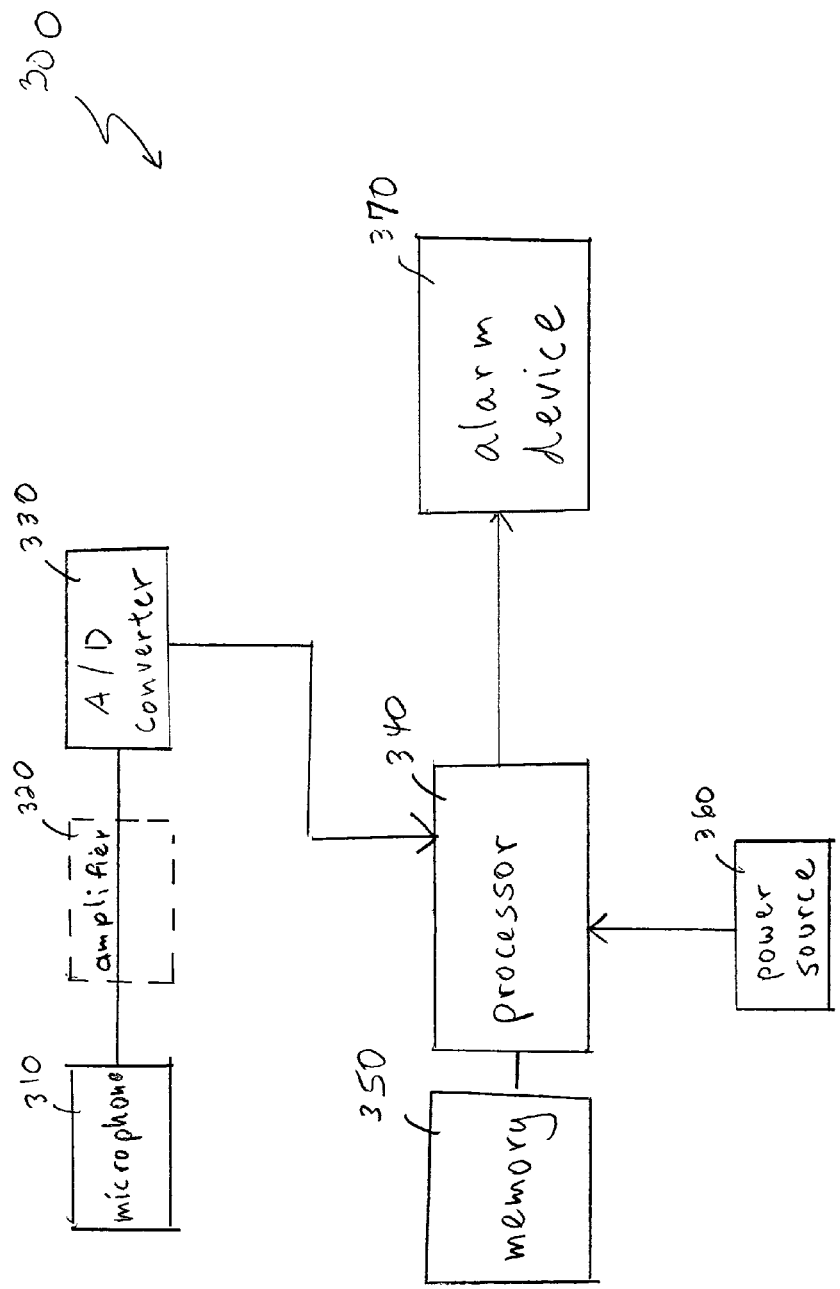
FIG. 3 is a hardware block diagram of a device for indicating activation of a smoke alarm according to a first embodiment of the invention.

FIG. 3 illustrates a device 300 for sensing an audible alarm of a smoke detector and activating a second alarm device according to an embodiment of the invention. The device 300 includes a microphone 310 for sensing ambient sounds. The microphone 310 is optionally connected to an amplifier 320 (shown in phantom in FIG. 3). The amplifier 320 is connected to an analog-to-digital (A/D) converter 330 for converting the analog signal from the microphone 310 to a digital signal representative of the ambient sound. The digitized sound data from the A/D converter 330 is input to a processor 340 for detection of a smoke detector audible alarm. The processor 340 may be a microprocessor, a digital signal processor, or any other type of processor. Although the processor 340 is illustrated by a single box in FIG. 3, it should be understood that the processor 340 may comprise a plurality of devices. In one embodiment, the processor 340 includes a dedicated device for computing a Fourier transform and a general purpose microprocessor. A memory 350 is connected to the processor 340.

The processor 340 is powered by a power source 360. In preferred embodiments, the power source 360 is a battery. Alternatively, the power source may include a transformer and rectifier for connection to an alternating current power source. In yet other embodiments, the power source 360 may be adapted to supply power to the processor 340 from an alternating current source when available and from a battery when the alternating current source is not available in a manner well known in the art.

When the processor detects an audible alarm from a smoke detector, the processor 340 outputs a signal to an alarm device 370. The alarm device 370 is a tactile alarm in preferred embodiments. Among the tactile alarms that may be used with the present invention are a vibrating watch, a vibrating pager, and bed shakers, including the Super Bed Vibrator and the variable speed Super Bed Vibrator sold under the mark SONIC ALERT®. The Super Vibrator has a 3.5" diameter, is 1.25" thick, and includes an unbalanced mass and a motor. This device may be placed under a mattress or pillow. Other tactile alarms may also be used.

Figure 4:
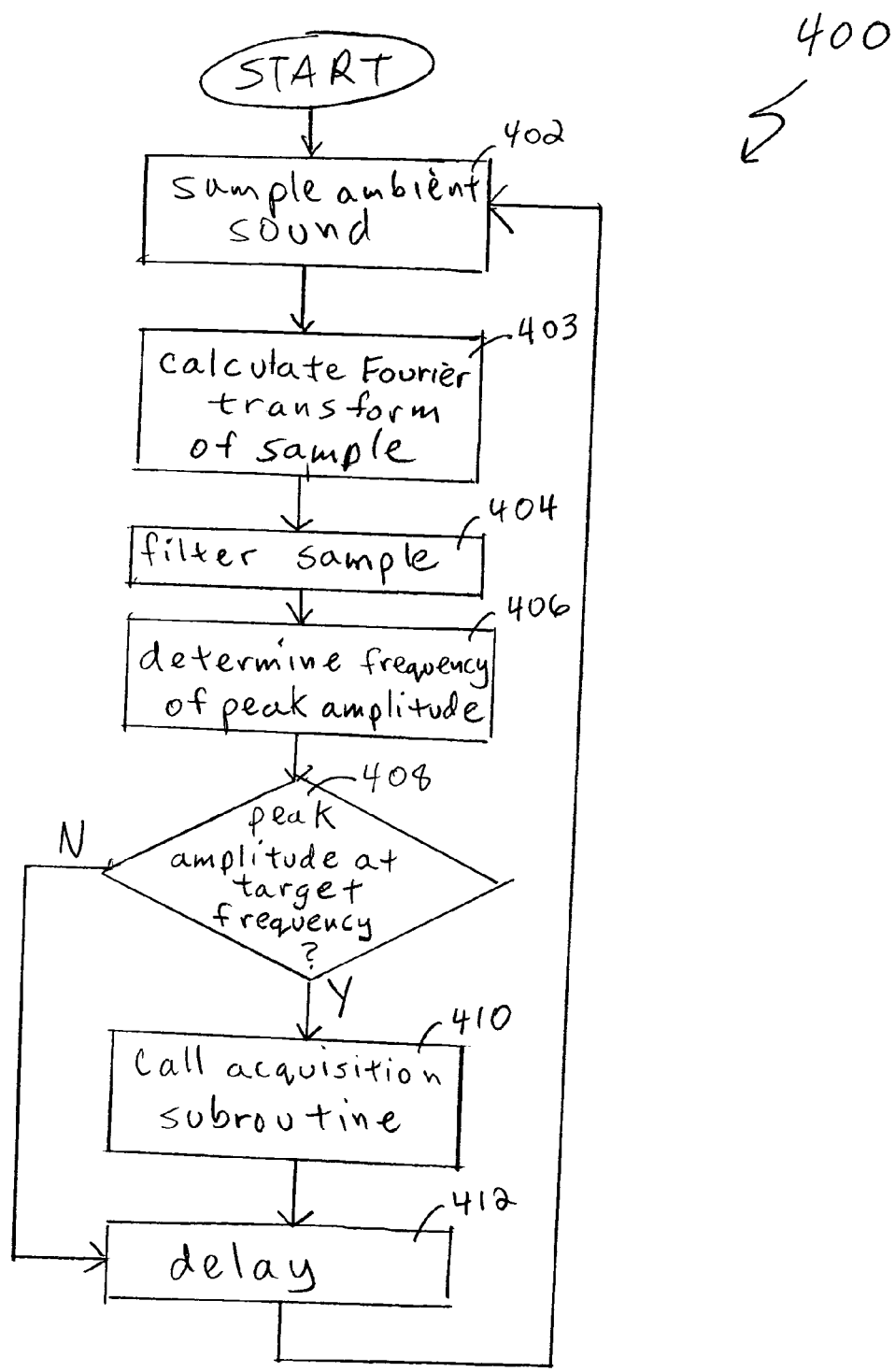
FIG. 4 is flow chart of an acquisition routine performed by the device of FIG. 2.

FIG. 4 is a flowchart 400 of the processing performed by the processor 340 in one embodiment of the invention. The ambient sound is sampled using the microphone 310 for a period of time at step 402. The period of time is chosen as 2 seconds in some embodiments. This period is chosen to exceed the long 1.5 second off period specified in the NFPA 72 standard. The processor 340 performs a Fourier transform on the digitized sound data output by the A/D converter 330 at step 403. Next, the data is filtered by eliminating data at frequencies below a low frequency threshold at step 404. Those of skill in the art will recognize that the filtering step could be replaced through the insertion of a high pass analog filter prior to the A/D converter 330.

After the data has been filtered at step 404, a maximum amplitude of the filtered data is determined at step 406. If this maximum amplitude is at a frequency corresponding to the expected frequency of a smoke detector alarm—i.e., 3200 Hz +/−10% (2880–3520 Hz), at step 408, an acquisition routine is entered at step 410. After the acquisition routine is complete, or if the peak identified at step 406 is not at the correct frequency at step 408 (which means that some device other than a smoke detector is currently making the loudest noise), the processor 340 delays for a period of time at step 412 and step 402 is repeated. In preferred embodiments, the delay period at step 412 is 10 seconds.

The routine illustrated in the flowchart 400 of FIG. 4 serves as a monitoring routine that runs periodically to determine whether there is a possibility that a smoke detector alarm is sounding. "Periodic" in this context means from time to time, and includes running the routine at both fixed and varying intervals. The choice of a 2 second monitoring period and a 10 second delay period corresponds to a duty cycle of approximately 17%. Alternatively, rather than a continuous 2 second monitoring period, a series of shorter samples spaced over an interval longer than the 1.5 second "off" period (or the longest off period in the target temporal pattern) could be used. The periodic monitoring routine, rather than continuous monitoring, is performed to conserve power, which is especially important in battery powered devices. In other embodiments of the invention, such as those powered by conventional household alternating current from a wall receptacle, this monitoring routine 400 may be omitted and the acquisition routine 410 may be performed continuously.

Figure 5A:
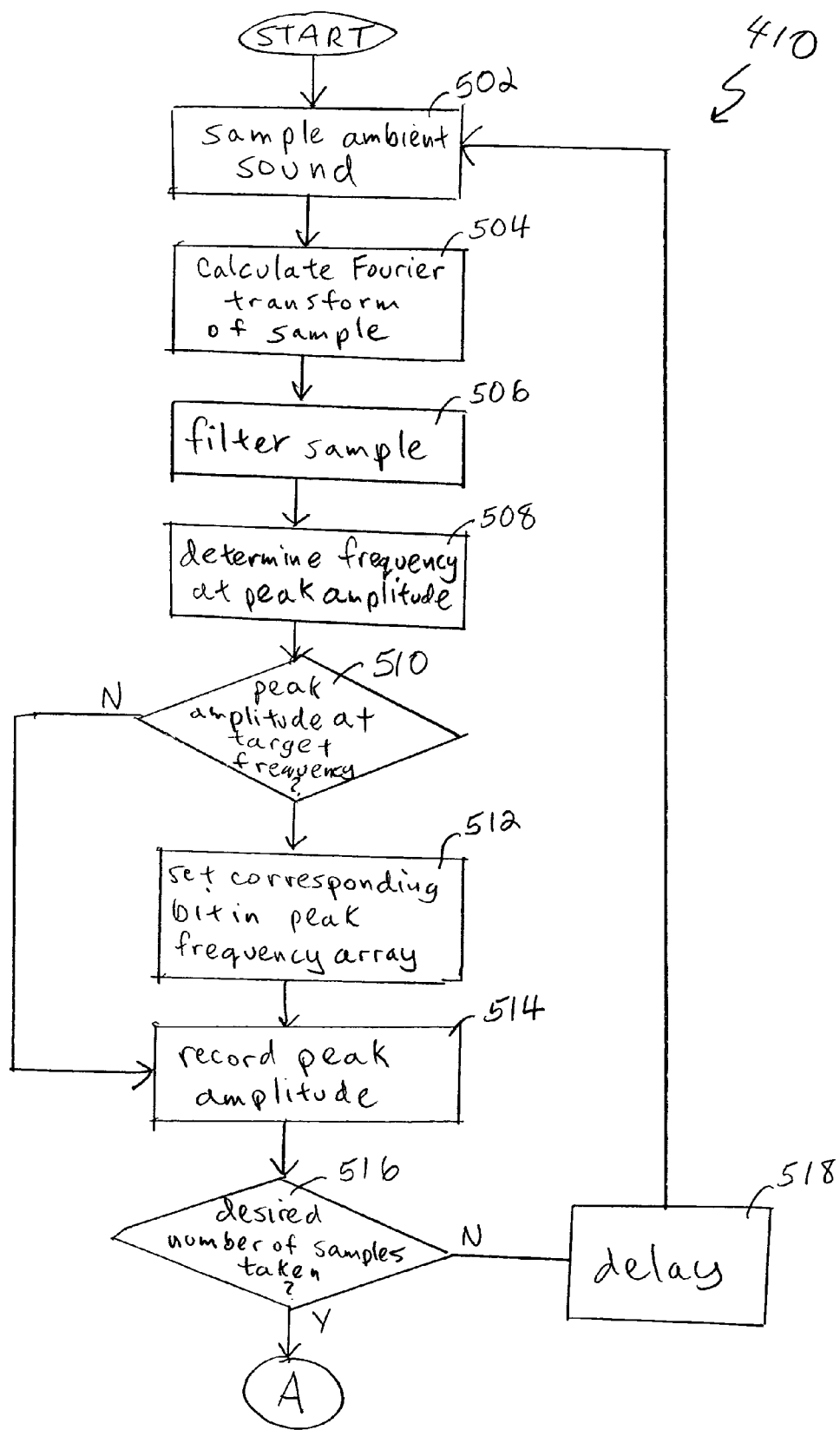
FIGS. 5a and 5b together comprise a flow chart of a detection subroutine performed by the device of FIG. 2.
Figure 5B:
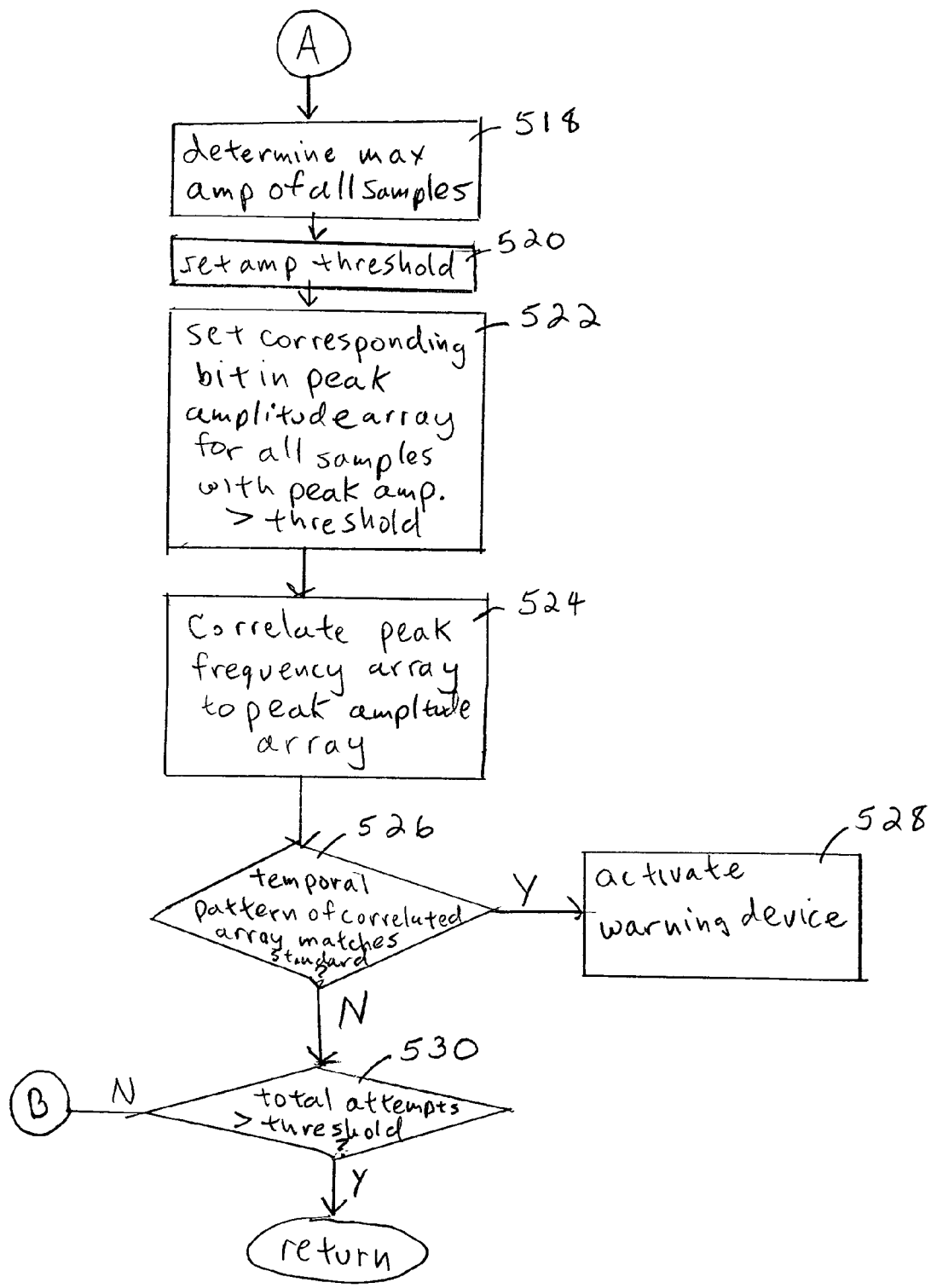

Details of the monitoring routine 410 are illustrated in FIGS. 5a and 5b. The routine starts with sampling the ambient sound for a short period of time at step 502. In some embodiments, this sampling period is 50 milliseconds. The minimum length of the sample period should be chosen such that the number of samples that are taken is sufficient to obtain good frequency resolution from a Fourier transform of the data; thus, the minimum length of the sampling period depends upon the sample rate of the hardware. The processor 340 converts the sample to the frequency domain by taking the Fourier transform at step 504, and the sample is high-pass filtered at step 506 by excluding data below a frequency threshold (500 Hz in preferred embodiments). Next, the frequency of the peak amplitude is determined at step 508. If the peak amplitude is at the expected frequency of a smoke detector alarm (3200 Hz +/−10%, or 2880–3520 Hz, as above), a corresponding bit is set in a peak frequency array in the memory 350 at step 512; otherwise, the corresponding bit remains a "0." The peak frequency array is preferably a one dimensional array of bits with a total number of bits equal to the total number of samples (e.g., 12) in the total sample period. After step 512 (or after step 510 if the frequency of the peak amplitude is not at the expected frequency of a smoke detector alarm at step 510), the peak amplitude for the sample is recorded in the memory at step 514.

As will be discussed further below, the peak frequency array will be correlated with a peak amplitude array and then compared to an expected temporal pattern. This ensures that the peak frequencies for each "on" period of the NFPA 72 pattern match the expected frequency of the smoke detector audible alarm. It is not important whether or not the frequency of the amplitude peaks in "off" periods is at the target frequency, and an "off" period that has a peak frequency at the target frequency of the smoke detector alarm will not result in a match not being declared because it is possible that the ambient noise has a peak at the same frequency as the smoke detector alarm during an "off" period.

Figure 6:
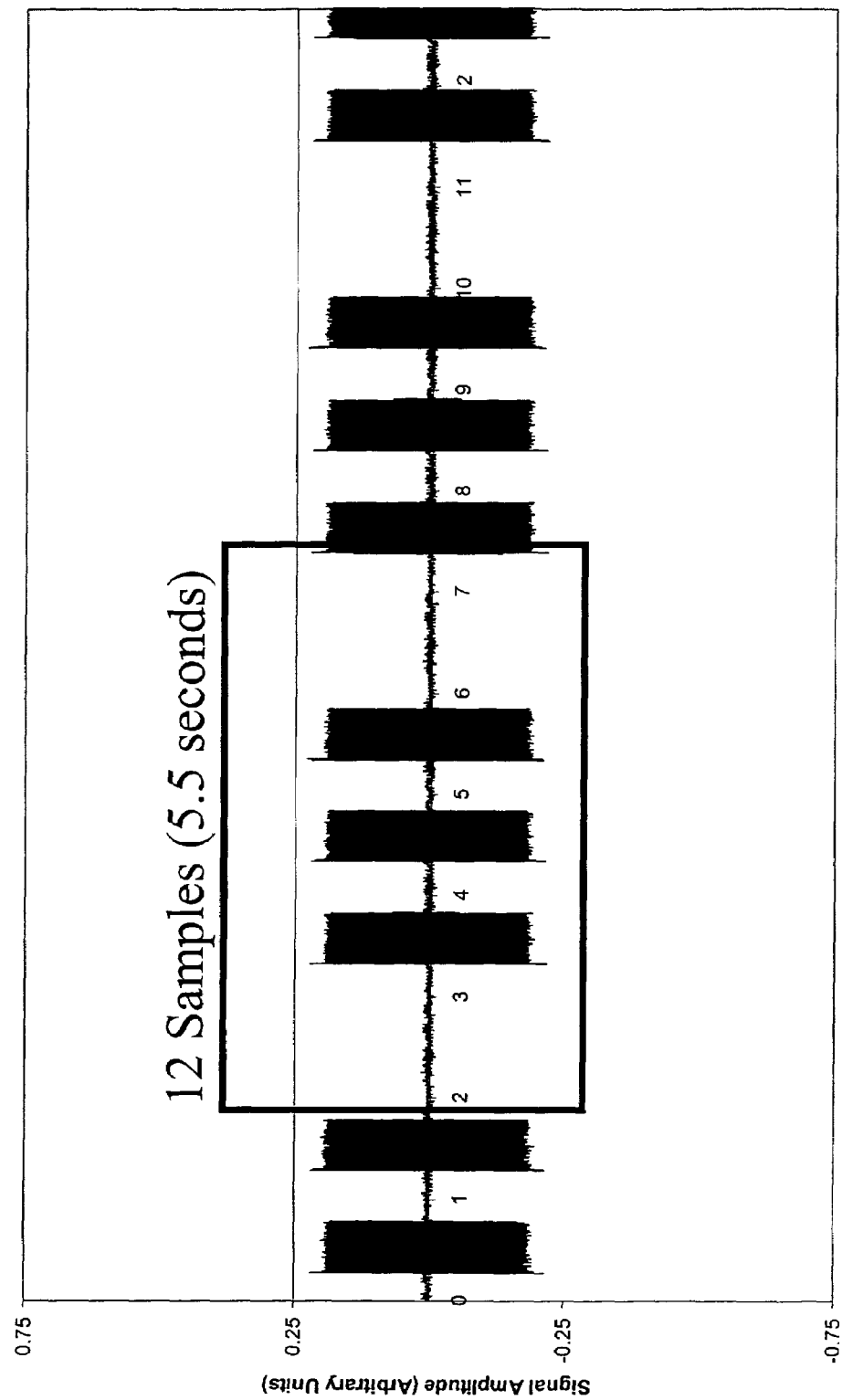
FIG. 6 illustrates a total sample period for the subroutine of FIGS. 5a and 5b.
Figure 7:
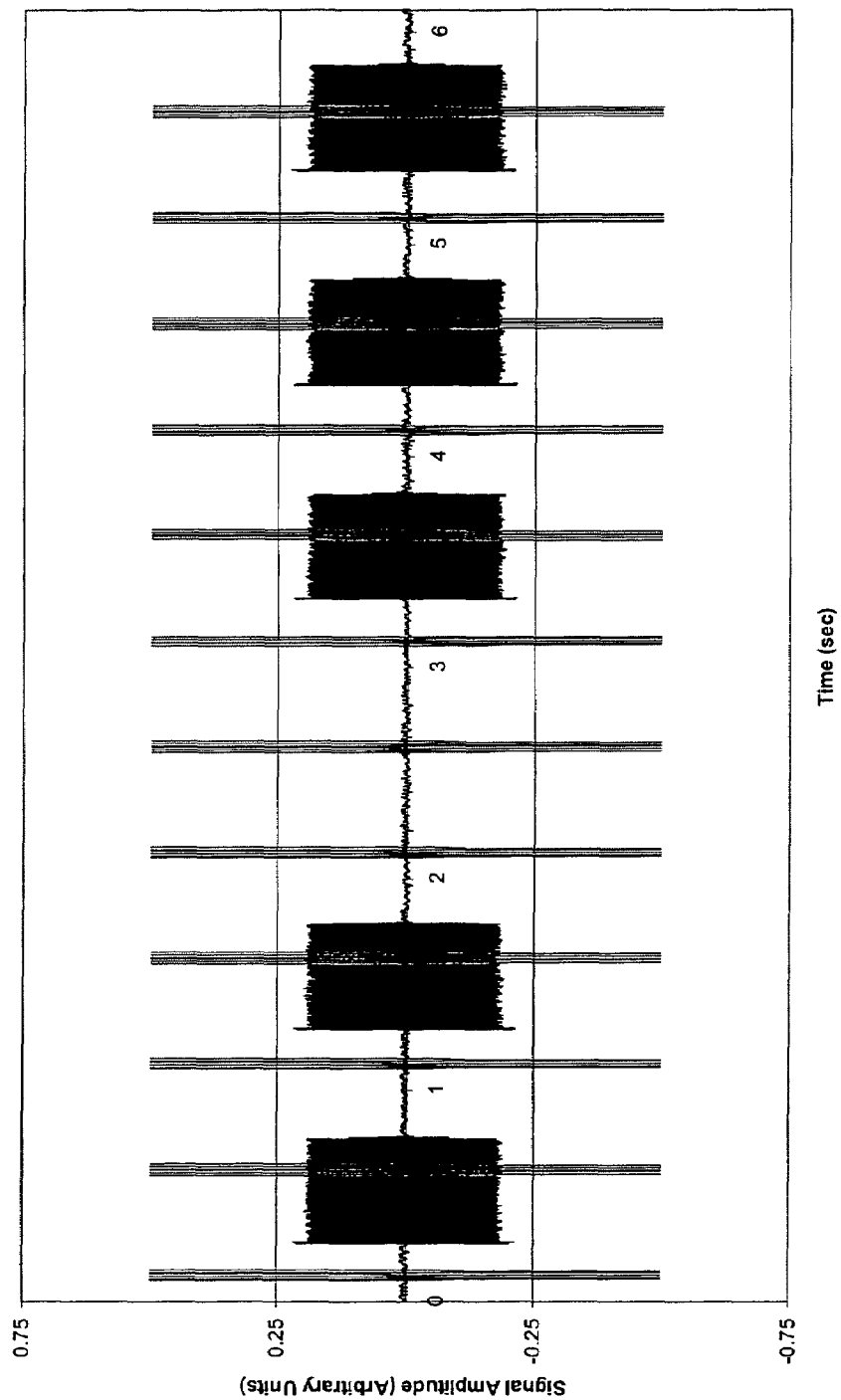
FIG. 7 illustrates the individual sample period of the subroutine of FIGS. 5a and 5b.

If a desired number of samples has not yet been taken at step 514, the processor 340 delays for a period of time at step 518 and another sample is taken at step 502. In preferred embodiments, the delay period is chosen as 0.5 seconds since the start of the last sample period, which corresponds to the 0.5 second "on" and 0.5 second "off" period of the temporal pattern mandated by NFPA 72. The total number of samples is chosen as 12 in preferred embodiments, which corresponds to a 5.5 second total sample period given the half second spacing between sample periods. As illustrated in FIG. 6, five and a half seconds corresponds to the minimum amount of time necessary to ensure that the three "on" periods and the long "off" period mandated by NFPA 72 as well as one additional "on" period are within the total sample period. FIG. 7 illustrates the 12 sample periods superimposed over one possible audible alarm signal.

Referring now back to FIG. 5a, once the desired number of samples for a total sample period has been taken at step 516, the maximum amplitude of all samples in the total period is determined at step 518. Next, an amplitude threshold based on the maximum amplitude is set at step 520. The amplitude threshold will be used to determine the threshold amplitude corresponding to an "on" condition. In some embodiments, the amplitude threshold is chosen as 80% of the maximum amplitude. The amplitude threshold is dependent upon the expected amplitude of the variance of the source (i.e., the audible alarm of the smoke detector). Thus, the amplitude threshold may differ depending upon the universe of "target" smoke detectors and a desired false alarm rate.

It should be noted that the setting of an amplitude threshold as a function of a maximum threshold is believed to be an important aspect of the false alarm control of the present invention. This choice of threshold recognizes that the maximum amplitude of a smoke detector alarm will not be known because the maximum amplitude varies as a function of the square of the distance between the device 300 and the smoke detector, but that the maximum amplitude will generally be the same during "on" periods because the smoke detector alarm is at a constant level during "on" periods and the distance between the device 300 and the smoke detector generally does not change. It should also be noted that the amplitude threshold is selected as a function of maximum amplitude rather than as a function of maximum amplitude relative to noise, or signal to noise, because the background noise may be changing and therefore the signal-to-noise ratio would not be constant even though the amplitude of the smoke detector alarm is constant. This amplitude threshold plays an important part in false alarm prevention because it helps to distinguish smoke detector alarms from other devices with intermittent sounds that vary in amplitude, such as a television set.

After the threshold amplitude is determined at step 520, the corresponding bit in a peak amplitude array is set for each sample in which the maximum amplitude exceeds the threshold amplitude at step 522. The peak amplitude array, like the peak frequency array, is preferably a one dimensional array of bits, with the total number of bits equal to the total number of samples (e.g., 12) in the total sample period. As an example, suppose that the maximum amplitudes detected in the total sample period were as follows:

| Sample | Max. Amp. |
| --- | --- |
| 1 | 9.3 |
| 2 | 1.0 |
| 3 | 9.1 |
| 4 | 2.1 |
| 5 | 9.4 |
| 6 | 0.2 |
| 7 | 0.4 |
| 8 | 0.8 |
| 9 | 9.4 |
| 10 | 1.1 |
| 11 | 9.5 |
| 12 | 1.0 |

In this case, the maximum amplitude was 9.5. The amplitude threshold would be 9.5*0.80=7.6. Thus, only the amplitudes in samples 1, 3, 5, 9 and 11 exceed the threshold and the resulting peak amplitude array would be 101010001010.

In some embodiments, there is a floor below which the amplitude threshold cannot be set. This floor corresponds to the 15 dB above ambient noise level mandated by NFPA 72. This 15 dB minimum assumes, however, that the correct number of smoke detectors for the building has been installed (i.e., that a smoke detector is within the maximum allowable distance). In other embodiments, the minimum is only 10 dB to account for such non-standard installations. This minimum amplitude threshold assures that false alarms will not be triggered by ambient noise.

Next, the peak amplitude array is correlated with the peak frequency array at step 524. As discussed above, the peak frequency array is an array of bits with a 1 for each sample in which the maximum amplitude corresponds to a frequency of 3200 Hz. In preferred embodiments, the correlation comprises taking a bitwise AND of the peak frequency array and peak amplitude array. The correlated array, which will also be a one-dimensional array with a number of bits equal to the number of samples, will have a bit set for each sample in which the peak amplitude exceeds the amplitude threshold AND in which the peak amplitude is at a frequency that matches the expected frequency of the smoke detector, namely approximately 3200 Hz. In a low noise environment, the peak frequency and peak amplitude arrays may match. However, this is not always the case. For example, actual testing conducted by the applicants has revealed that the peak frequency array may have bits set for samples where the peak amplitude array does not. This is believed to be due to faint echoes from "on" periods, which of course have the same frequency as the smoke detector alarm, that are detected during "off" periods in the NFPA 72 temporal pattern. Correlating the peak frequency array with the peak amplitude array prevents these echoes from being misinterpreted as "on" signals.

The correlated array is then compared to the temporal pattern of NFPA 72 at step 526. As discussed above, the total sample period is chosen such that there will be at least four "on" periods of the temporal pattern of NFPA 72. Three of the four "on" periods will be separated by 0.5 second "off" periods; the other "on" period will be separated by the 1.5 second "off" period. However, whether three "on" periods precede the fourth "on" period will not be known. Thus, the two possible patterns corresponding to these four "on" periods are as follows (with 1s representing "on" and 0s representing "off"): (a) 100010101, or (b) 101010001. Therefore, each of these two possible 9 bit patterns are compared to the 12 bit correlated array, at starting positions of the 12 bit array at the first, second, third and fourth bits (in other words, the pattern may start at any of the first four bits in the correlated array). If either pattern is found in the correlated array at step 526, the warning device is activated at step 528.

Unlike the peak frequency array, it is important that the peak amplitude array indicates an "off" during the samples corresponding to the "off" periods in the NFPA 72 temporal pattern. ANDing the peak frequency array (for which the state of samples corresponding to the "off" period is unimportant) with the peak amplitude array simplifies the comparison of the two arrays to the NFPA temporal pattern.

It should be noted that these two patterns contain more than a full "period" of the pattern mandated by NFPA 72. This is, a full period of the pattern of NFPA 72 includes only three "on" periods. The fourth "on" period in the above patterns, which corresponds to a second period of the NFPA 72 pattern, is included to provide an extra measure of false alarm prevention. In some embodiments, the fourth "on" period is not included in the target patterns.

If the pattern is not found in the correlated array at step 526, a total number of attempts is compared to a total correlation attempt threshold at step 530. In preferred embodiments, the total correlation attempt threshold is chosen as 10. Thus, the processor 340 will attempt to find the temporal pattern over 10 five and half second periods, for a total of 55 seconds, or approximately 1 minute. If the total correlation attempt threshold has not been reached at step 530, steps 502 et seq. are repeated. If the total correlation attempt threshold has been reached at step 530, the subroutine ends, and control reverts to step 412 (FIG. 4).

As discussed above, the device 300 may also be used to detect pre-1996 smoke detectors. For example, some pre-1996 smoke detectors emit audible alarms with temporal patterns consisting of a series of on and off pulses. In order to detect such smoke detectors, the sample rate is adjusted to accommodate the timing of the on/off pulses and the pattern of step 526 is changed to an alternating series of 1s and 0s. Other pre-1996 smoke detectors emit continuous sounds. For those detectors, the pattern is changed to a series of 1s. A series of 1s, rather than a single 1 (i.e., a single sample having an amplitude above the amplitude threshold), is used to ensure that the duration of any signal is sufficiently long to prevent short, brief sounds (e.g., from a TV) from being mistaken for an audible smoke detector alarm.

Figure 8:
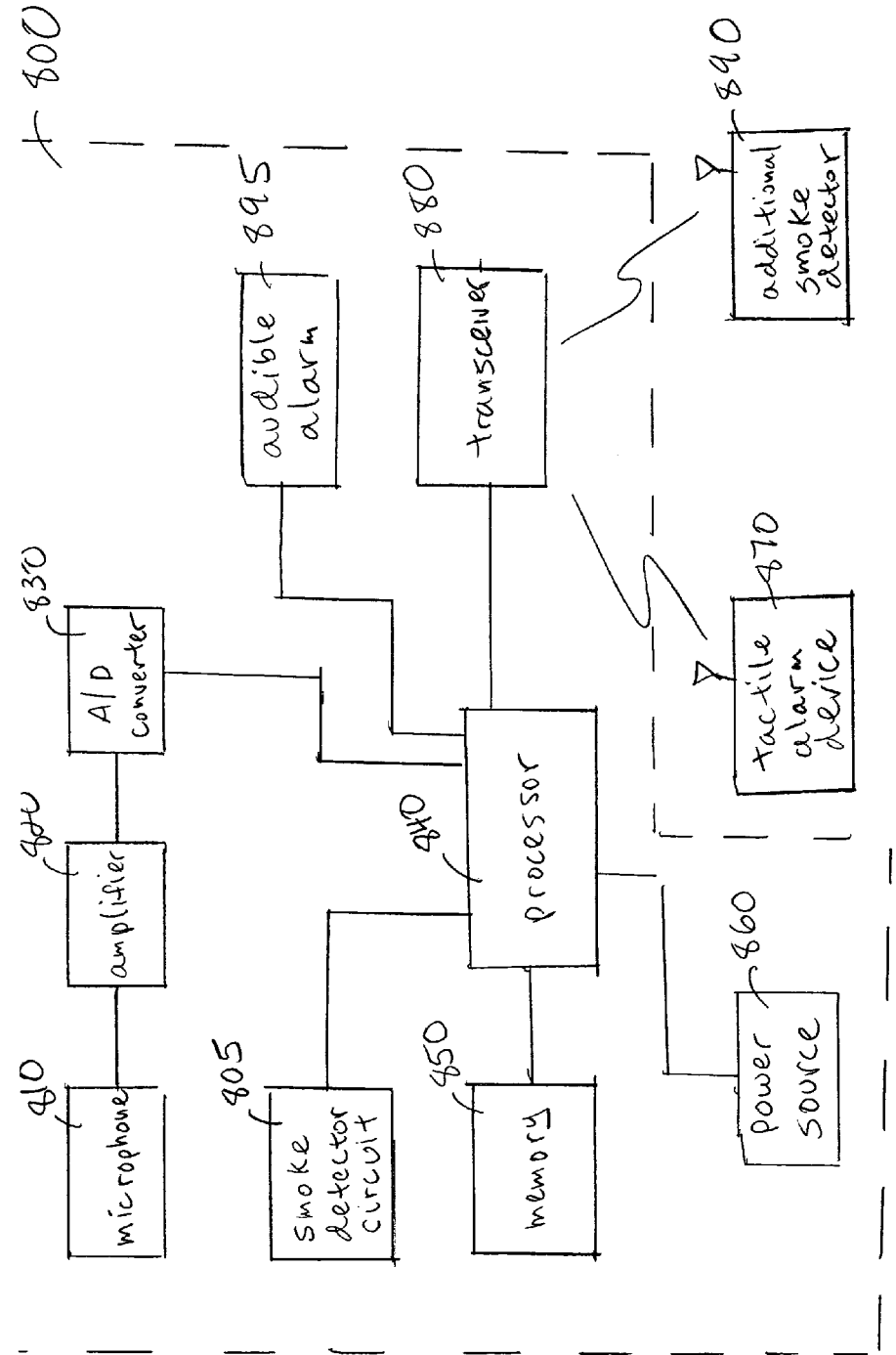
FIG. 8 is a hardware block diagram of a smoke detector according to a second embodiment of the present invention.
Figure 1:
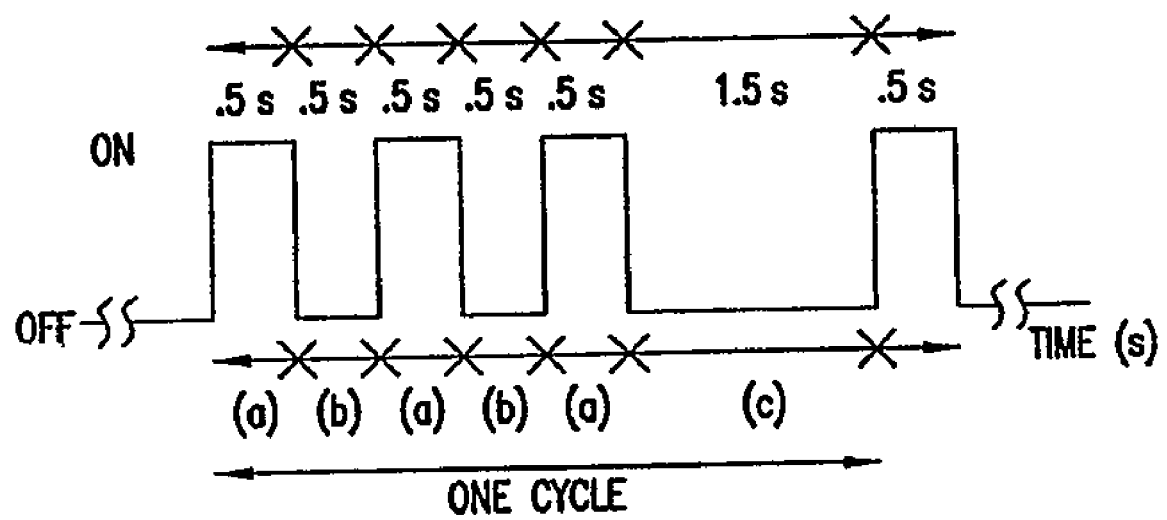
Figure 2A:
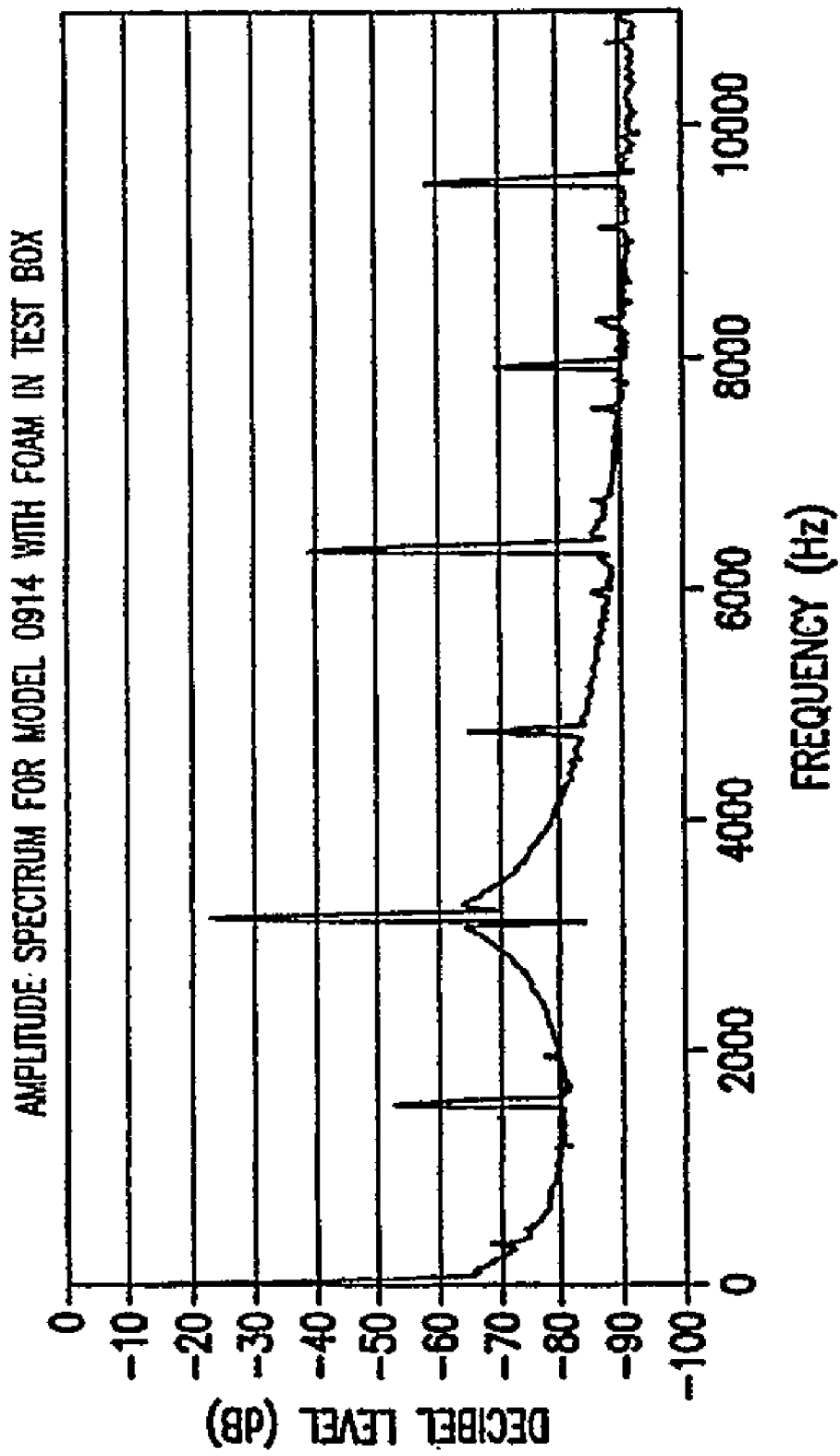
Figure 2B:
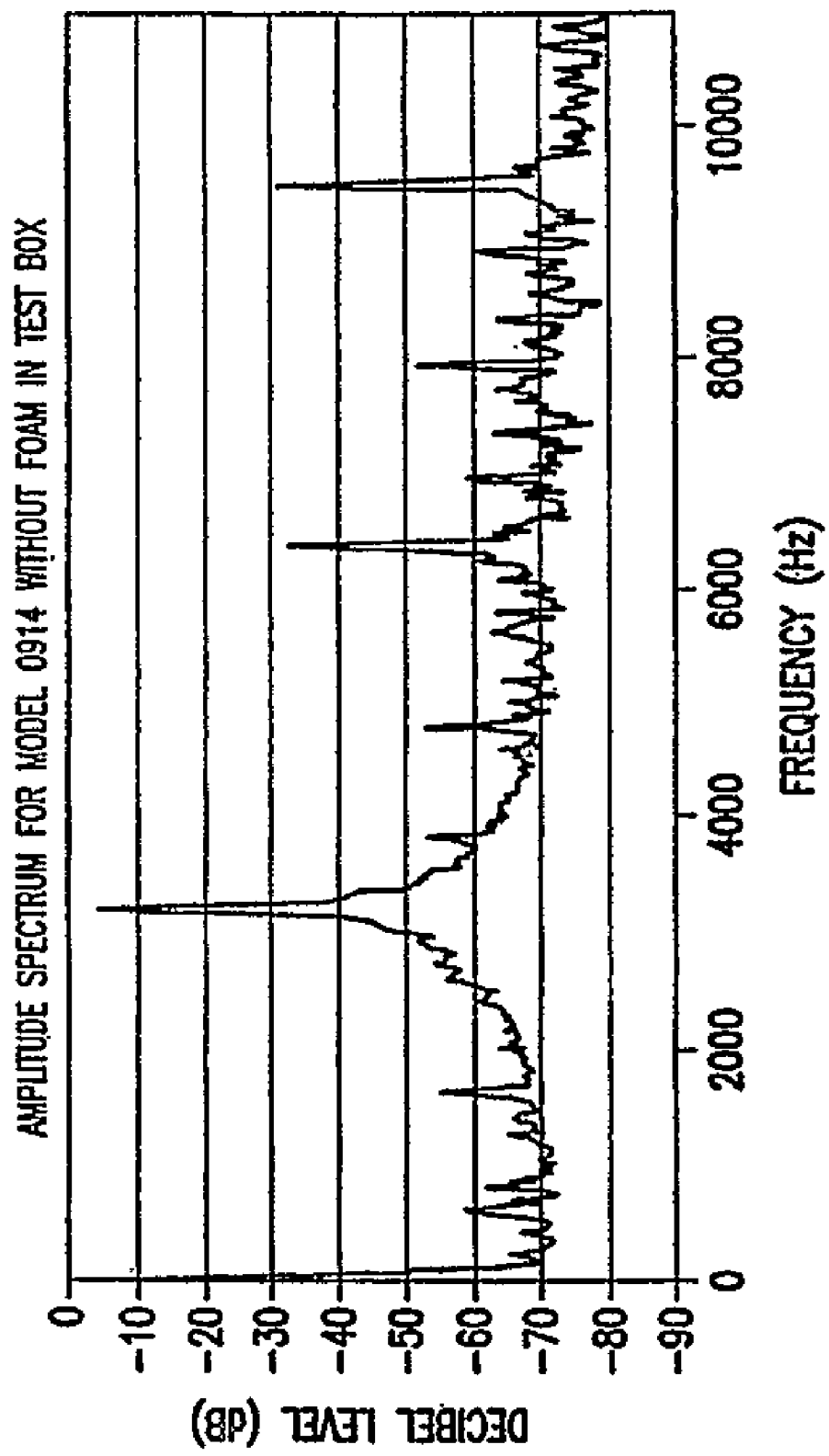
Figure 3:
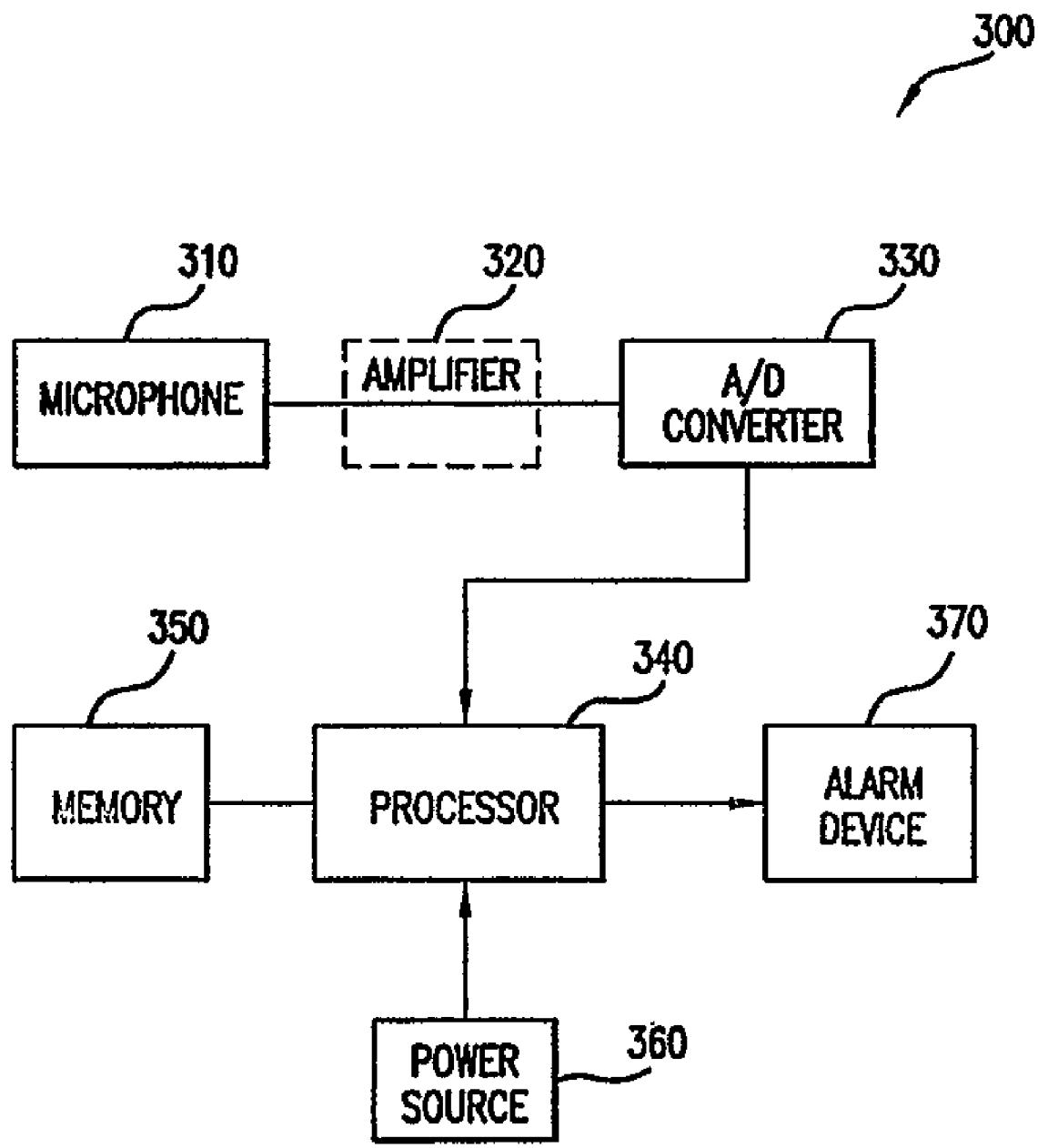
Figure 4:
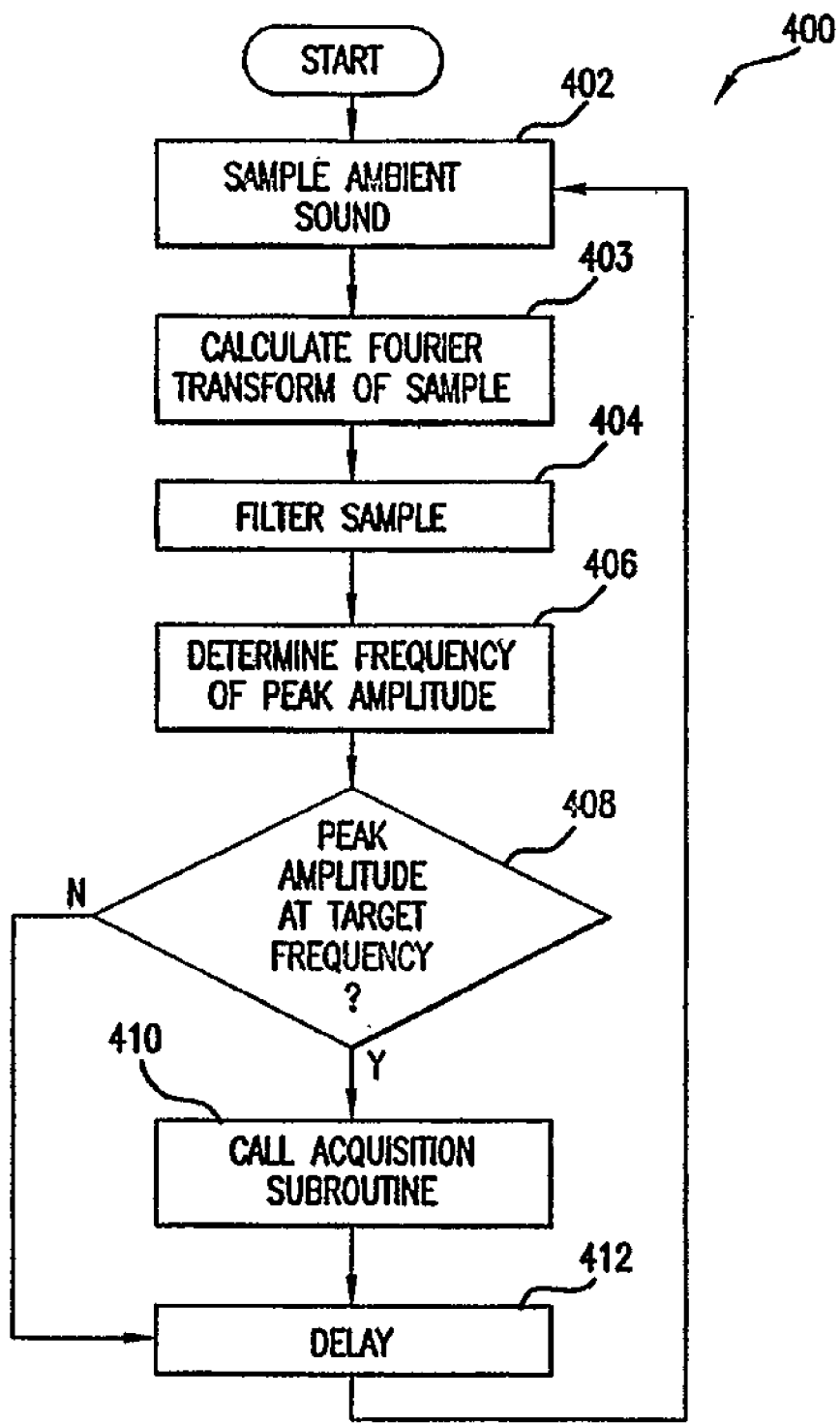
Figure 5A:
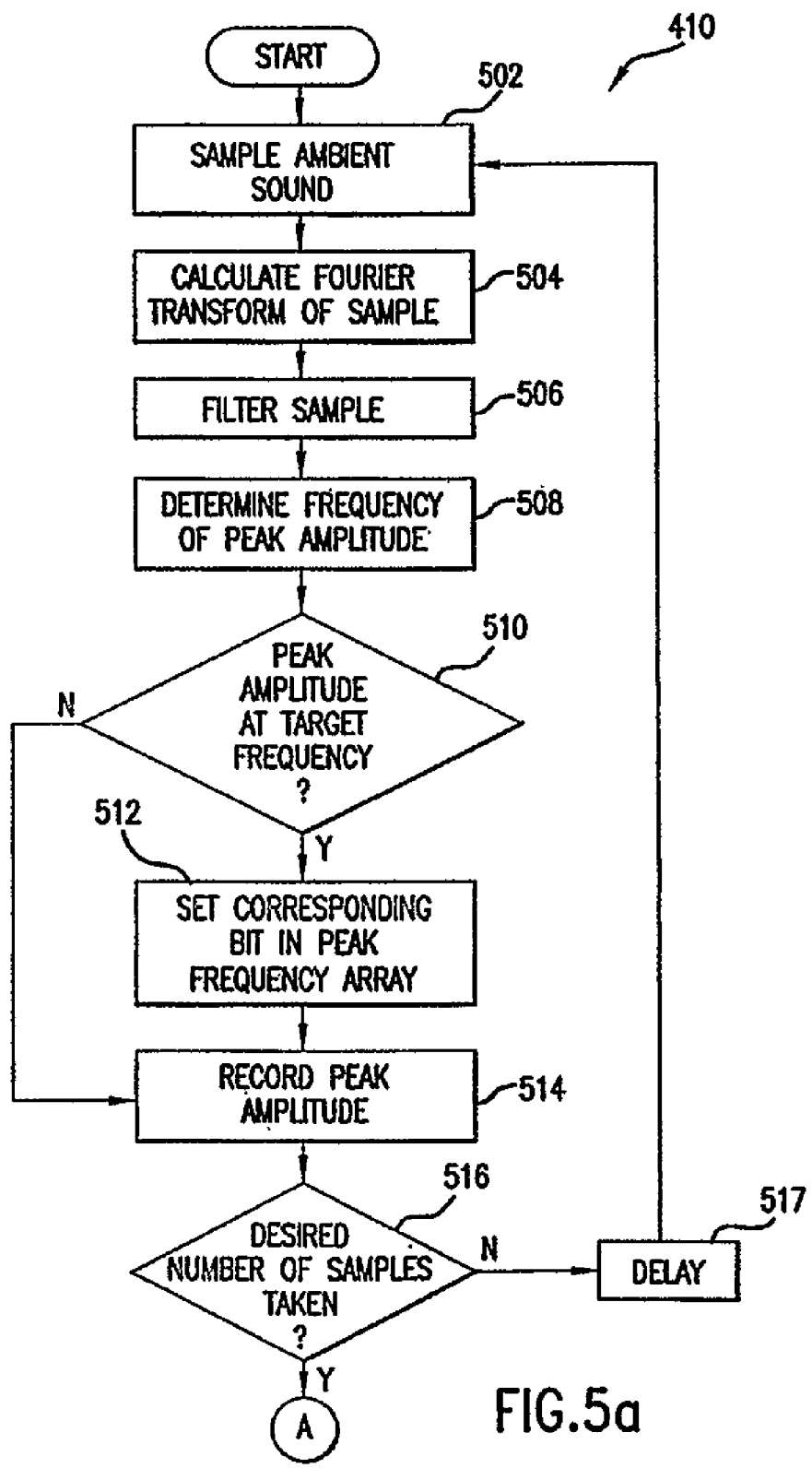
Figure 5B:
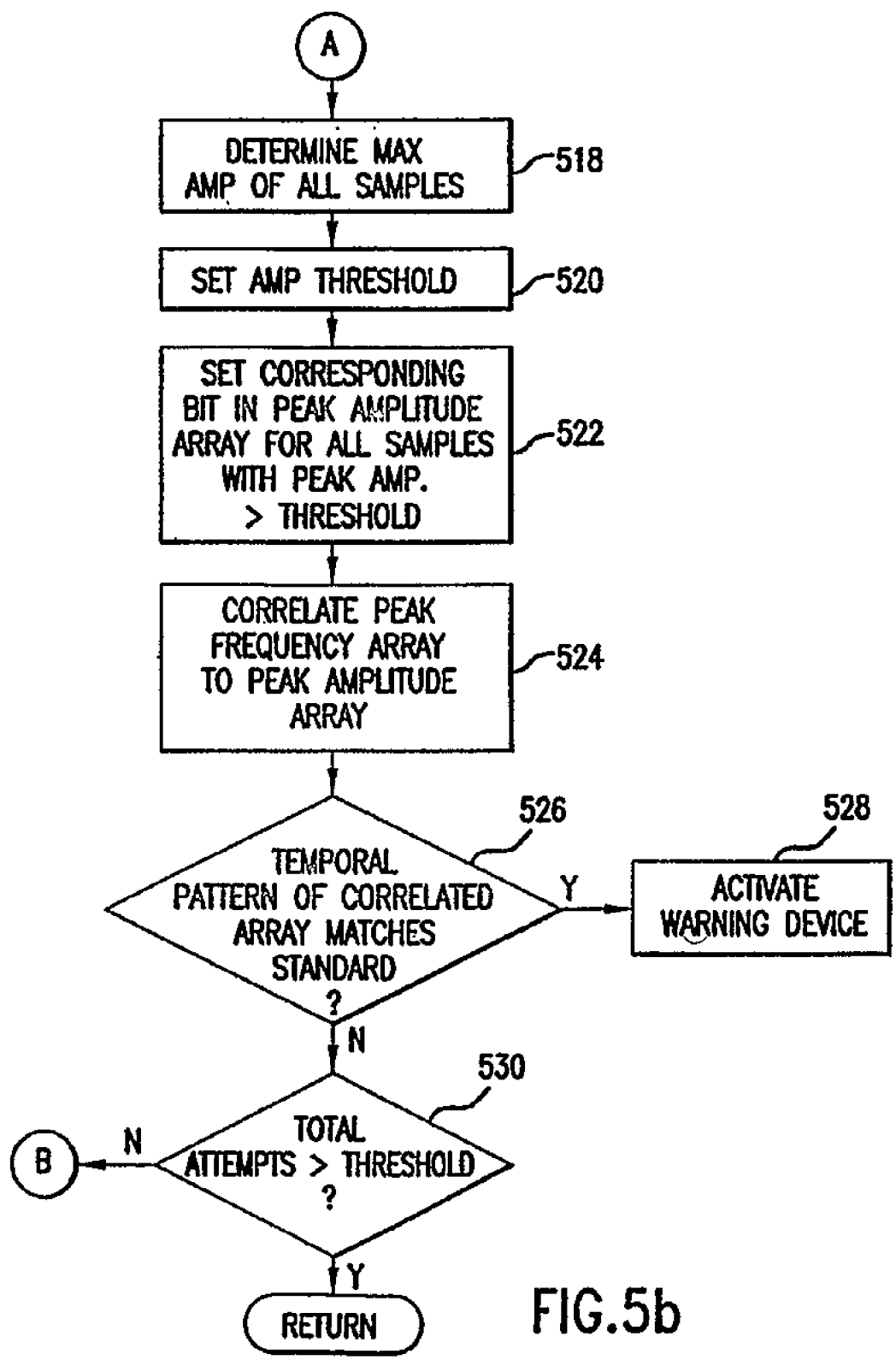
Figure 6:
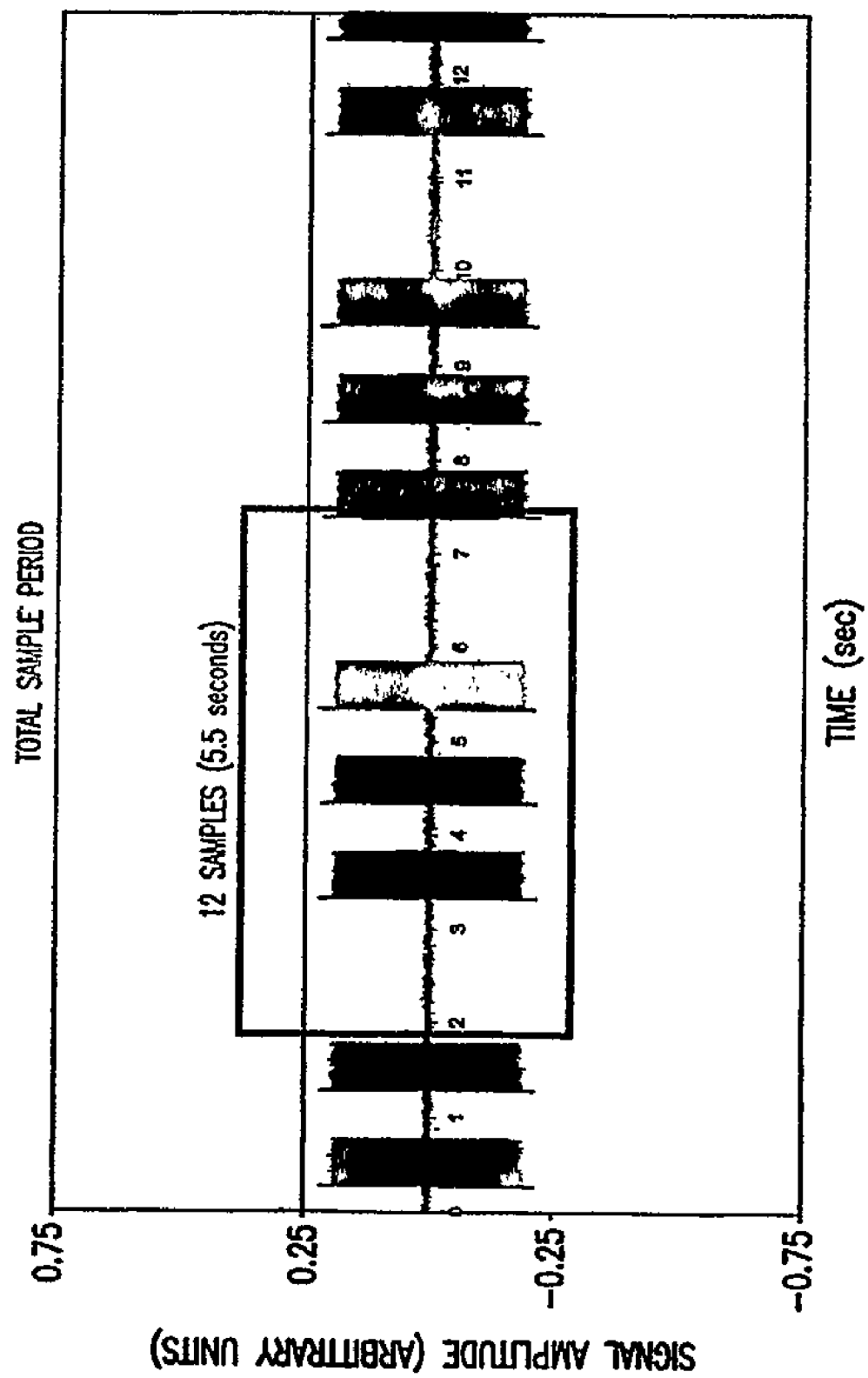
Figure 7:
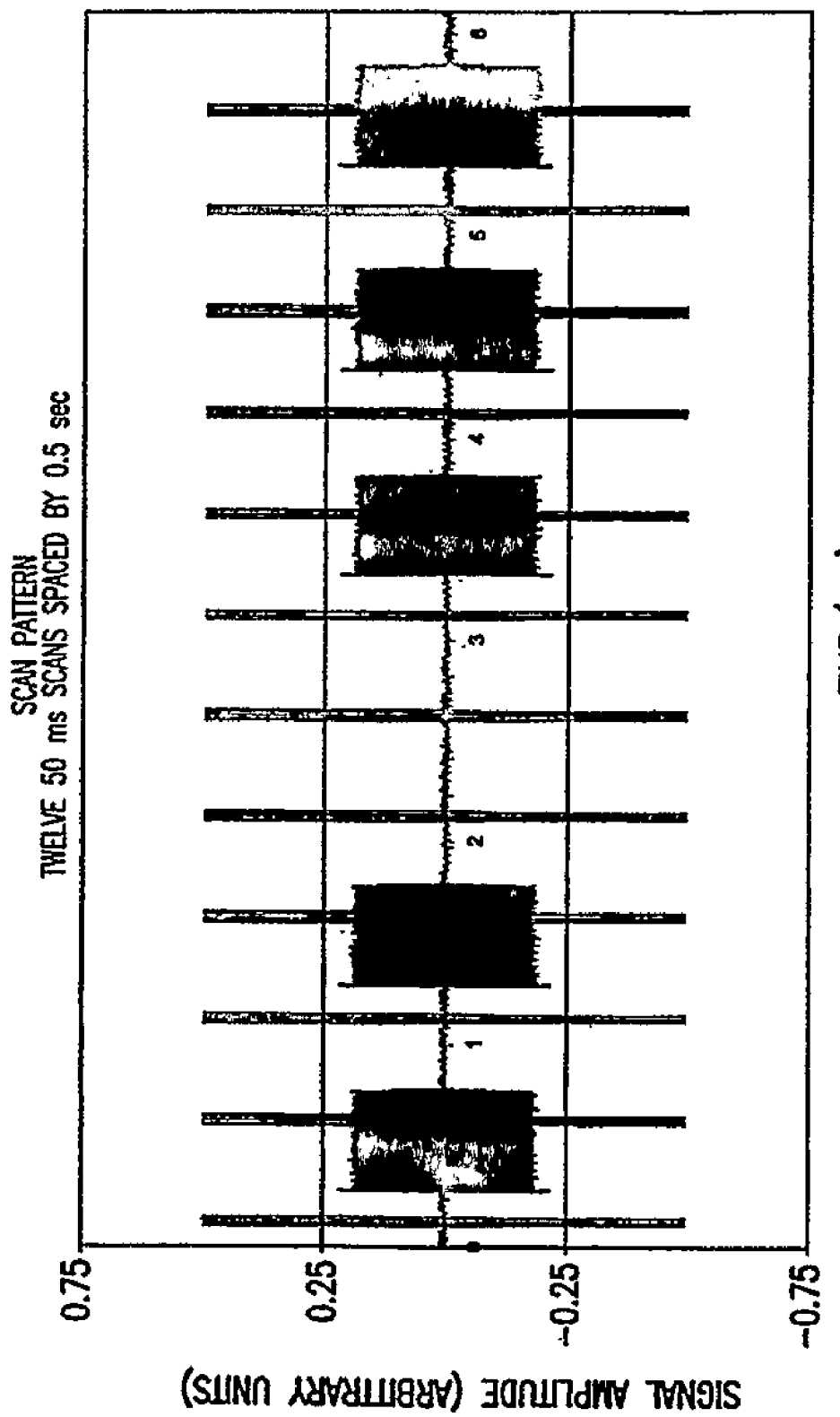

FIG. 8 illustrates a smoke detector 800 according to a second embodiment of the invention. The smoke detector 800 is suitable for mounting on a wall or ceiling in a manner similar to a conventional smoke detector. However, as will be discussed in further detail below, the smoke detector 800 is adapted to provide station-to-station activation as well as activation of a remote tactile alarm.

The smoke detector 800 includes a microphone 810 connected to an amplifier 820. The amplifier 820 is connected to an A/D converter 830. The A/D converter 830 is connected to the processor 840. The processor 840 is configured to detect an audible alarm in the digitized sound samples from the A/D converter 830 in the manner discussed above. Similarly, memory 850 and power source 860 perform the same functions as memory 350 and power source 360 of FIG. 3.

The smoke detector 800 further includes a smoke detector circuit 805 connected to the processor 840. The smoke detector circuit may be any conventional type known in the art. Also connected to the processor 840 is a transceiver 880 (which is typically an RF transceiver) that is capable of communicating with other smoke detectors (not shown in FIG. 8). When the processor 840 detects an audible alarm from another smoke detector (not shown in FIG. 8), or when the smoke detector circuit 805 detects a fire, or when an activation is received from another smoke detector via transceiver 880, the processor 840 sounds audible (and/or visual) alarm 895. Additionally, the processor 840 broadcasts an activation message to a tactile alarm device 870 and any additional smoke detectors 890.

The processor 840 of smoke detector 800 will activate alarm devices 870 and 895 when an activation message is received from another smoke detector via transceiver 880 or when another smoke detector audible alarm is detected. In alternative embodiments, both conditions must be satisfied before alarm device 870 and 895 are activated. This helps to reduce false alarms; however, it does make the detector 800 more susceptible to RF or aural interference.

It will be understood by those of skill in the art that the transmission of an activation message upon receipt of an activation message from another detector is desirable because it allows the detector 800 to act as a relay in cases where three or more detectors are installed at a location. Thus, for example, a first smoke detector may transmit an activation message that is received by the detector 800 but that is not received by a third smoke detector. In such a case, the activation message transmitted by the detector 800 upon receipt of the activation message from the first detector may reach the third detector.

It should be understood that the smoke detector 800 may not include all of the components of FIG. 8 in some embodiments. For example, the smoke detector 800 may not be used with a tactile alarm device 870 where alerting hearing impaired individuals is not necessary. Such embodiments may be used for the purpose of providing station-to-station activation without requiring hard wiring. Furthermore, such embodiments may not include the microphone 810, amplifier 820 and A/D converter 830 for detecting audible alarms from other detectors, relying instead on an RF activation signal from another detector and smoke detector circuit 805 to trigger activation. Alternatively, other embodiments are not adapted to receive activation device from other detectors via transceiver 880, relying instead on smoke detector circuit 805 and/or detection of audible alarms from other detectors to trigger audible alarm 895 and tactile alarm 870.

While the invention has been described with respect to certain specific embodiments of smoke detectors and methods and devices for detecting smoke detector audible alarms, it will be appreciated that many modifications and changes may be made by those skilled in the art without departing from the spirit of the invention. It is intended therefore, by the appended claims to cover all such modifications and changes as fall within the true spirit and scope of the invention.

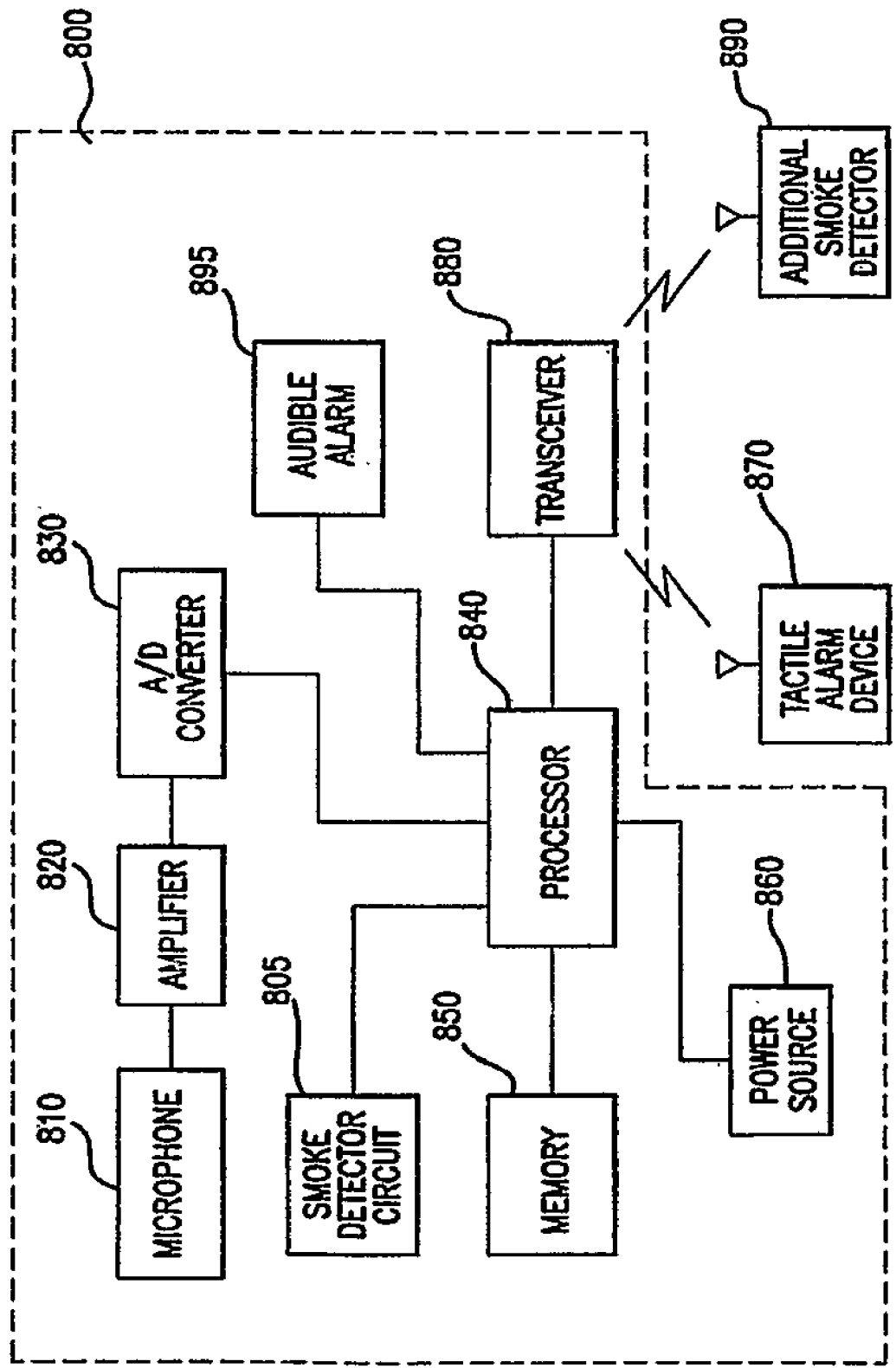

What is claimed is:

1. A method for detecting whether an audible alarm generated by a smoke detector is active, the audible alarm having an alarm period comprising a plurality of on periods and a plurality of off periods arranged in a predetermined temporal pattern, each of the on periods being a period during which an audible alarm sound is generated by the smoke detector, each of the off periods being a period during which no audible sound is generated by the smoke detector, the method comprising:

detecting a peak amplitude in each of a plurality of sample periods, each of the sample periods corresponding to one of the expected on or off periods in a single alarm period;

selecting a maximum peak amplitude from among the peak amplitudes;

setting an amplitude threshold, the amplitude threshold being a function of the maximum peak amplitude;

comparing each of the peak amplitudes to the amplitude threshold for each of the sample periods to determine which sample periods have a peak amplitude that exceeds the amplitude threshold;

determining whether the audible alarm is active based at least in part on whether the temporal pattern of sample periods in which the peak amplitude exceeds the amplitude threshold matches the predetermined temporal pattern.

2. The method of claim 1, further comprising the step of:

determining a frequency corresponding to the peak amplitude in each of the sample periods corresponding to an on period in the predetermined temporal pattern;

wherein the determining step is further based on whether a frequency corresponding to the peak amplitude in each of the sample periods corresponding to an on period in the predetermined temporal pattern corresponds to an alarm frequency at which each of the audible alarm sounds is generated.

3. The method of claim 1, wherein the amplitude threshold is no less than a minimum amplitude above an average ambient noise level.

4. The method of claim 1, further comprising the steps of:

obtaining, prior to the detecting step, an ambient sound sample;

examining a parameter of the ambient sound sample to determine whether the audible alarm is present; and delaying, in the absence of a possibility that the audible alarm may be present, a period of time and repeating the obtaining and examining steps;

wherein the detecting, setting, selecting, comparing and determining steps are performed when there is a possibility that an audible alarm may be present.

5. The method of claim 1, further comprising the step of activating an alerting device when the audible alarm is active.

6. The method of claim 5, wherein the alerting device is a tactile alerting device.

7. The method of claim 1, further comprising the step of sending an activation message to a remote device.

8. A device for detecting whether an audible alarm generated by a smoke detector is active, the audible alarm having an alarm period comprising a plurality of on periods and a plurality of off periods arranged in a predetermined temporal pattern, each of the on periods being a period during which an audible alarm sound is generated by the smoke detector, each of the off periods being a period during which no audible sound is generated by the smoke detector, the device comprising:

a microphone; and a processor connected to the microphone;

wherein the processor is configured to perform the steps of:

detecting a peak amplitude in each of a plurality of sample periods, each of the sample periods corresponding to one of the expected on or off periods in a single alarm period;

selecting a maximum peak amplitude from among the peak amplitudes;

setting an amplitude threshold, the amplitude threshold being a function of the maximum peak amplitude;

comparing each of the peak amplitudes to the amplitude threshold for each of the sample periods to determine which sample periods have a peak amplitude that exceeds the amplitude threshold;

determining whether the audible alarm is active based at least in part on whether the temporal pattern of sample periods in which the peak amplitude exceeds the amplitude threshold matches the predetermined temporal pattern.

9. The device of claim 8, wherein the processor is further configured to perform the step of:

determining a frequency corresponding to the peak amplitude in each of the sample periods corresponding to an on period in the predetermined temporal pattern;

wherein the determining step is further based on whether a frequency corresponding to the peak amplitude in each of the sample periods corresponding to an on period in the predetermined temporal pattern corresponds to an alarm frequency at which each of the audible alarm sounds is generated.

10. The device of claim 8, wherein the amplitude threshold is no less than a minimum amplitude above an average ambient noise level.

11. The device of claim 8, wherein the processor is further configured to perform the steps of:

obtaining, prior to the detecting step, an ambient sound sample;

examining a parameter of the ambient sound sample to determine whether the audible alarm is present; and delaying, in the absence of a possibility that the audible alarm may be present, a period of time and repeating the obtaining and examining steps;

wherein the detecting, setting, selecting, comparing and determining steps are performed when there is a possibility that an audible alarm may be present.

12. The device of claim 8, further comprising an alerting device connected to the processor.

13. The device of claim 12, wherein the alerting device is a tactile alerting device.

14. The device of claim 8, wherein the processor is further configured to perform the step of sending an activation message to a remote device.

* * * * *

UNITED STATES PATENT AND TRADEMARK OFFICE
CERTIFICATE OF CORRECTION

| | | |
|---|---|---|
| PATENT NO. | : 7,015,807 B2 | Page 1 of 11 |
| APPLICATION NO. | : 10/676779 | |
| DATED | : March 21, 2006 | |
| INVENTOR(S) | : Richard J. Roby et al. | |

It is certified that error appears in the above-identified patent and that said Letters Patent is hereby corrected as shown below:

Please replace the handwritten drawings sheets 1-10 with the enclosed formal drawings (1-10)

Column 3, line 19
Change "FIG. 4 is flow chart..." to --FIG 4. is a flow chart--

Column 6, line 38
Change "518" to --517--

Signed and Sealed this

Nineteenth Day of December, 2006

JON W. DUDAS
*Director of the United States Patent and Trademark Office*